(12) United States Patent
Miyamoto (10) Patent No.: US 9,659,546 B2
(45) Date of Patent: May 23, 2017

(54) CONTROL APPARATUS AND CONTROL METHOD TO CONTROL EXTERNAL DEVICE DEPENDING ON MOTION OF HUMAN BODY

(71) Applicant: NEC Display Solutions, Ltd., Tokyo (JP)

(72) Inventor: Tsuneo Miyamoto, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 14/650,549

(22) PCT Filed: Dec. 17, 2012

(86) PCT No.: PCT/JP2012/082646
§ 371 (c)(1),
(2) Date: Jun. 8, 2015

(87) PCT Pub. No.: WO2014/097365
PCT Pub. Date: Jun. 26, 2014

(65) Prior Publication Data
US 2015/0310832 A1    Oct. 29, 2015

(51) Int. Cl.
*G06F 3/045*    (2006.01)
*G09G 5/12*    (2006.01)
(Continued)

(52) U.S. Cl.
CPC .............. *G09G 5/12* (2013.01); *G01J 5/0025* (2013.01); *G09G 3/3696* (2013.01); *G09G 5/00* (2013.01);
(Continued)

(58) Field of Classification Search
CPC ........ G09G 5/12; G09G 3/3696; G01J 5/0025
(Continued)

(56) References Cited

U.S. PATENT DOCUMENTS 8,988,356 B2 * 3/2015 Tseng .................. G06F 3/04883
345/172
2004/0221183 A1   11/2004 Lu
(Continued)

FOREIGN PATENT DOCUMENTS

CN      1363868 A      8/2002
CN      1987720 A      6/2007
(Continued)

OTHER PUBLICATIONS

International Search Report (ISR) (PCT Form PCT/ISA/210), in PCT/JP2012/082646, dated Feb. 26, 2013.
(Continued)

*Primary Examiner* — Calvin C Ma
(74) *Attorney, Agent, or Firm* — McGinn IP Law Group, PLLC.

(57) ABSTRACT

A display apparatus includes a detector configured to detect an infrared ray emitted from a human body; a state signal generator configured to generate a state signal including at least one of a first state signal component indicating that the human body is approaching the detector and a second state signal component indicating that the human body is leaving from the detector in response to an intensity variance of the infrared ray detected with the detector; and a controller configured to start controlling an external device upon detecting the first state signal component from the state signal generated by the state signal generator but to stop controlling the external device upon detecting the second state signal component from the state signal.

19 Claims, 6 Drawing Sheets

(51) Int. Cl.
  *G09G 5/00* (2006.01)
  *G01J 5/00* (2006.01)
  *G09G 3/36* (2006.01)
(52) U.S. Cl.
  CPC ... *G09G 2330/021* (2013.01); *G09G 2354/00* (2013.01); *G09G 2360/144* (2013.01)
(58) Field of Classification Search
  USPC .......................................... 345/156, 172–174
  See application file for complete search history.

(56) References Cited

U.S. PATENT DOCUMENTS

2008/0036743 A1* 2/2008 Westerman ............. G06F 3/038
                                                    345/173
2008/0168290 A1* 7/2008 Jobs ........................ G06F 1/26
                                                    713/324

FOREIGN PATENT DOCUMENTS

| CN | 201765790 U | 3/2011 |
| JP | H 02-52042 U | 4/1990 |
| JP | H 03-75584 A | 3/1991 |
| JP | H 05-281035 A | 10/1993 |
| JP | H 08-96967 A | 4/1996 |
| JP | H 10-268984 A | 10/1998 |
| JP | 2006-331237 A | 12/2006 |
| JP | 2008-064971 A | 3/2008 |
| JP | 2009-054191 A | 3/2009 |
| JP | 2011-109488 A | 6/2011 |
| JP | 2011-191123 A | 9/2011 |
| JP | 2011-202987 A | 10/2011 |
| JP | 2012-238093 A | 12/2012 |

OTHER PUBLICATIONS

Chinese Office Action dated Jun. 29, 2016 in Chinese Application No. 201280077726.4 with an English translation thereof.
Japanese Office Action, dated Jan. 4, 2017, in Japanese Application No. 2014-552764 and English Translation thereof.

* cited by examiner

CONTROL APPARATUS AND CONTROL METHOD TO CONTROL EXTERNAL DEVICE DEPENDING ON MOTION OF HUMAN BODY

TECHNICAL FIELD

The present invention relates to a control apparatus, a control method, and a display apparatus.

BACKGROUND ART

Liquid crystal display apparatuses, equipped with human sensors, which are designed to control backlight brightness based on results of detecting human bodies are known (see Patent Literature Document 1). The liquid crystal display apparatus of this document is a display apparatus using a distance sensor, serving as a human sensor, which irradiates an infrared ray and receives reflected light so as to detect a human body.

CITATION LIST

Patent Literature Document

Patent Literature Document 1: Japanese Patent Application Publication No. 2008-64971

SUMMARY OF INVENTION

Technical Problem

Distance sensors may have a risk of detecting any objects other than human bodies. Additionally, distance sensors irradiating relatively intense infrared rays cannot be applied to environments (e.g. medical sites) disallowing irradiation of infrared rays.

The present invention is created to solve the above problem and provides a control apparatus, a control method, and a display apparatus, all of which are designed to accurately detect human motions while reducing erroneous operations.

Solution to Problem

[1] To solve the above problem, a control apparatus according to one aspect of the present invention includes a detector configured to detect an infrared ray emitted from a human body; a state signal generator configured to generate a state signal including at least one of a first state signal component indicating that the human body is approaching the detector and a second state signal component indicating that the human body is leaving from the detector in response to an intensity variance of the infrared ray detected with the detector; and a controller configured to start controlling an external device upon detecting the first state signal component from the state signal generated by the state signal generator but to stop controlling the external device upon detecting the second state signal component from the state signal.

[2] To solve the above problem, a control method according to one aspect of the present invention includes a step of detecting an infrared ray emitted from a human body; a step of generating a state signal including at least one of a first state signal component indicating an approach of the human body and a second state signal component indicating a deflection of the human body in response to an intensity variance of the detected infrared ray; and a step of starting controlling an external device upon detecting the first state signal component from the generated state signal but stopping controlling the external device upon detecting the second state signal component from the state signal.

[3] To solve the above problem, a display apparatus according to one aspect of the present invention includes a detector configured to detect an infrared ray emitted from a human body; a state signal generator configured to generate a state signal including at least one of a first state signal component indicating that the human body is approaching the detector and a second state signal component indicating that the human body is leaving from the human body in response to an intensity variance of the infrared ray detected with the detector; a controller configured to start outputting a control signal upon detecting the first state signal component from the state signal generated by the state signal generator but to stop outputting the control signal upon detecting the second state signal component from the state signal; a power source configured to generate power based on the control signal by receiving the control signal output from the controller; and a display configured to carry out a display operation by receiving the power from the power source.

Advantageous Effects of Invention

The present invention is able to accurately detect human motions while reducing erroneous operations.

DESCRIPTION OF EMBODIMENTS

Hereinafter, one embodiment of the present invention will be described in detail with reference to the drawings. A control apparatus according to one embodiment of the present invention determines an approach or a deflection of a human body by detecting a human motion, thus controlling an external device based on the determination result and the predetermined management time. Herein, an approach of a human body towards the control apparatus indicates that a human body is approaching the control apparatus. A deflection of a human body from the control apparatus indicates that a human body is leaving from the control apparatus.

Figure 1:
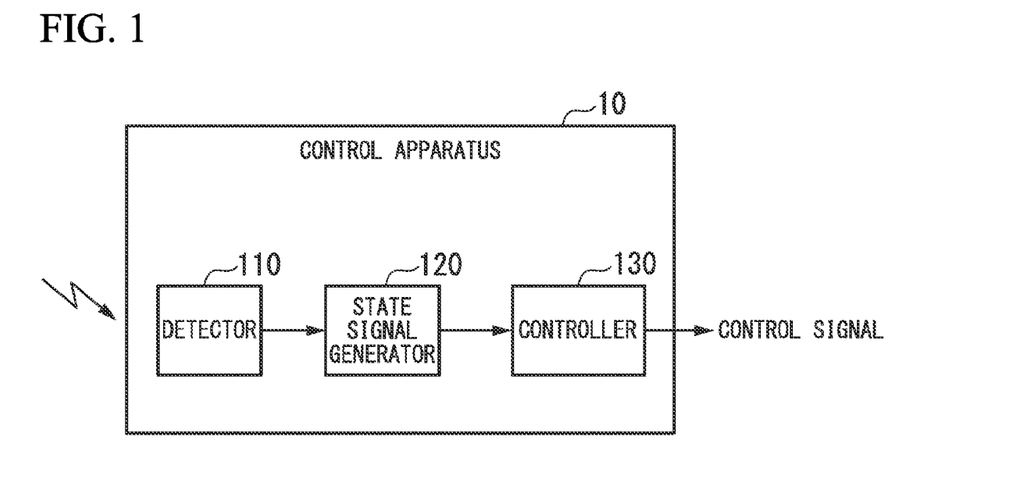
FIG. 1 is a block diagram showing the functional configuration of a control apparatus according to one embodiment of the present invention.

FIG. 1 is a block diagram showing the functional configuration of the control apparatus according to one embodiment of the present invention. As shown in FIG. 1, a control apparatus 10 includes a detector 110, a state signal generator 120, and a controller 130.

The detector 110 is a human sensor which detects an infrared ray emitted from a human body so as to supply an infrared detection signal, representing the intensity of an infrared ray, to the state signal generator 120. Normally, an infrared ray emitted from a human body having a temperature of 37° C. has a peak wavelength of about 10 μm. The peak wavelength is a wavelength maximizing emission energy. For example, the detector 110 detects infrared rays in a wavelength range including a wavelength of 10 μm.

The state signal generator 120 receives an infrared detection signal supplied from the detector 110 so as to generate a state signal indicating a human motion based on an intensity variance of an infrared detection signal, thus supplying the state signal to the controller 130. The state signal represents a first state or a second state. The first state indicates the state where a human body is approaching the detector 110. The second state indicates the state where a human body is leaving from the detector 110. For example, the state signal generator 120 generates a state signal including a positive-polarity state signal component indicating the first state when the level of an infrared detection signal is below a threshold. Alternatively, the state signal generator 120 generates a state signal including a negative-polarity state signal component indicating the second state when the level of an infrared detection signal exceeds the threshold. That is, the state signal generator 120 generates a state signal having either a positive polarity or a negative polarity depending on an intensity variance of an infrared ray detected by the detector 110, thus supplying the state signal to the controller 130.

Upon receiving a state signal supplied from the state signal generator 120, the controller 130 outputs a control signal so as to start controlling an external device at the timing (or first timing) of detecting the positive polarity of a state signal or to stop controlling an external device at the timing (or second timing) of detecting the negative polarity of a state signal. The controller 10 controls an external device with a control signal. For example, an external device may serve as a display apparatus, an information processing apparatus, or an electronic device such as a home appliance.

Additionally, the controller 130 outputs a control signal to start controlling an external device at the first timing but to stop controlling an external device after the lapse of a first time from the start timing. Alternatively, the controller 130 outputs a control signal to stop controlling an external device after the lapse of a second time from the second timing. The relationship between the time lengths of the first and second times will be described later.

Figure 2:
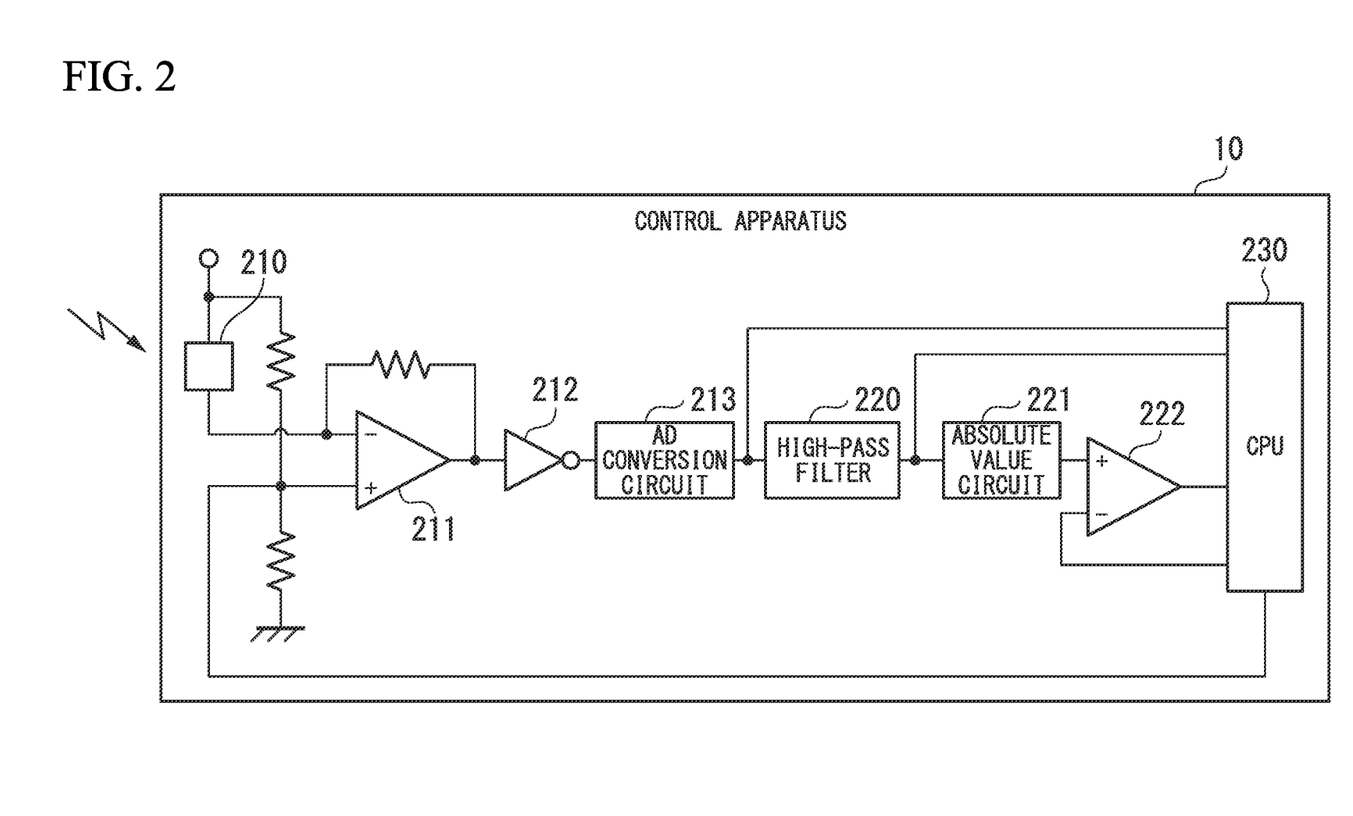
FIG. 2 is a circuit diagram showing an example of a circuit configuration embodying the control apparatus shown in FIG. 1.

FIG. 2 is a circuit diagram showing an example of the circuit configuration embodying the control apparatus 10 shown in FIG. 1. As shown in FIG. 2, the control apparatus 10 includes simplified circuit blocks such as an infrared detection element 210, a current-voltage conversion circuit 211, an inversion circuit 212, an analog-digital (Analog to Digital) conversion circuit 213, a high-pass filter 220, an absolute value circuit 221, a comparison circuit 222, and a CPU 230. In FIG. 2, the analog-digital conversion circuit 213 will be referred to as the AD conversion circuit 213.

The infrared detection element 210 detects an infrared ray emitted from a human body so as to generate a current depending on the intensity of an infrared ray, thus supplying the current, serving as a detection current, to the current-voltage conversion circuit 211. The infrared detection element 210 outputs a higher detection current as the detected intensity of an infrared ray becomes higher. For example, the infrared detection element 210 can be embodied using a photodiode configured to detect an infrared ray in a wavelength range including a wavelength of 10 μm. It is possible to appropriately determine the waveband of infrared rays subject to detection. When a photodiode is applied to the infrared detection element 210, it is possible to reduce the size and thickness of the infrared detection element 210, thus improving the degree of freedom in the layout of parts installed in the control apparatus 10.

In this connection, it is possible to configure the infrared detection element 210 by use of any elements which are able to detect infrared rays emitted from human bodies so as to produce voltages depending on the intensities of infrared rays. For example, it is possible to configure the infrared detection element 210 by use of a thermopile or a pyroelectric infrared sensor. In this case, it is possible to preclude the current-voltage conversion circuit 211, which will be described below.

The current-voltage conversion circuit 211 receives a detection current output from the infrared detection element 210. The current-voltage conversion circuit 211 receives an offset current, supplied from the CPU 230, through two partial resistors, thus applying an offset voltage thereto. For example, the offset voltage is used to limit the input level of the AD conversion circuit 213 to a half of a dynamic range. The current-voltage conversion circuit 211 receiving an offset voltage generates a detection voltage, depending on the detection current and a feedback resistance, at the output terminal thereof, thus supplying the detection voltage to the inversion circuit 212. As shown in FIG. 2, for example, the current-voltage conversion circuit 211 is configured of an operational amplifier. According to the configuration of FIG. 2, the current-voltage conversion circuit 211 generates a lower detection voltage as the detection current supplied thereto becomes higher.

The inversion circuit 212 inverts the polarity of a detection voltage supplied from the current-voltage conversion circuit 211. That is, the inversion circuit 212 generates a higher detection voltage as the intensity of an infrared ray detected by the infrared detection element 210 becomes higher. In other words, the inversion circuit 212 outputs an analog signal, serving as an infrared detection signal, so as to supply the infrared detection signal to the AD conversion circuit 213.

The AD conversion circuit 213 receives an analog infrared detection signal, supplied from the inversion circuit 212, so as to convert the analog infrared detection signal into a digital infrared detection signal, thus supplying the digital infrared detection signal to the high-pass filter 220 and the CPU 230.

For example, it is possible to configure the detector 110 including the infrared detection element 210, the current-voltage conversion circuit 211, the inversion circuit 212, and the AD conversion circuit 213.

The high-pass filter 220 receives the digital infrared detection signal, supplied from the AD conversion circuit 213, so as to transmit signal components of a frequency band, higher than the predetermined cutoff frequency, while blocking or attenuating signal components of a frequency band below the cutoff frequency. That is, the high-pass filter 220 outputs a state signal component having a positive polarity (i.e. a first state signal component), which will be attenuated to the "0 (zero)" level in the lapse of time, after the infrared detection signal is increased to the positive peak value during the state of change where the potential of the infrared detection signal is being varied from a low level to a high level higher than a low level. Additionally, the high-pass filter 220 outputs a state signal component having a negative polarity (i.e. a second state signal component), which will converge at the "0 (zero)" level in the lapse of time, after the infrared detection signal is decreased to the negative peak value during the state of change where the potential of the infrared detection signal is being varied from a high level to a low level lower than a high level. Both the positive-polarity state signal component and the negative-polarity state signal component may serve as a motion detection signal. The high-pass filter 220 supplies the motion detection signal to the absolute value circuit 221 and the CPU 230. The high-pass filter 220 carries out a high-pass filtering process on the infrared detection signal, supplied from the AD conversion circuit 213, so as to eliminate effects due to temperature fluctuations or temperature drifting included in the infrared detection signal. That is, the control apparatus 10 is able to detect a human motion very accurately by carrying out a high-pass filtering process on the infrared detection signal.

In other words, the high-pass filter 220 has a function of a motion detector. That is, the motion detector detects variances of an infrared detection signal through a filtering process on the infrared detection signal input thereto. Specifically, the motion detector carries out a high-pass filtering process on an infrared detection signal so as to detect a positive-polarity state signal component indicating an approach of a human body. Additionally, the motion detector carries out a high-pass filtering process on an infrared detection signal so as to detect a negative-polarity state signal component indicating a deflection of a human body.

The absolute value circuit 221 receives a motion detection signal, supplied from the high-pass filter 220, so as to convert a negative-polarity state signal component to a positive-polarity state signal component, thus generating a switching trigger signal which will be supplied to the comparison circuit 222.

The comparison circuit 222 receives a switching trigger signal supplied from the absolute value circuit 221. Additionally, the comparison circuit 222 receives a comparison reference voltage supplied from the CPU 230. The comparison circuit 222 generates a pulse signal which becomes a high level in response to a higher signal component of a switching trigger signal than the comparison reference voltage or which becomes a low level in response to a lower signal component of a switching trigger signal than the comparison reference voltage, thus supplying the pulse signal, serving as a switching timing signal, to the CPU 230. In this connection, the comparison circuit 222 may receive the comparison reference voltage from the CPU 230 or it may receive the comparison reference voltage from a power source through resistors.

In other words, both the absolute value circuit 221 and the comparison circuit 222 have a function of a timing detector. The timing detector detects the leading-edge timing of a positive-polarity state signal and the trailing-edge timing of a negative-polarity state signal.

For example, it is possible to configure the state signal generator 120 including the high-pass filter 220, the absolute value circuit 221, and the comparison circuit 222. Herein, a state signal corresponds to a set of a motion detection signal output from the high-pass filter 220 and a switching timing signal output from the comparison circuit 222.

The CPU 230 loads and executes a control program, stored in a memory device not shown, so as to operate as the controller 130. The CPU 230 receives a digital infrared detection signal supplied from the AD conversion circuit 213, a motion detection signal supplied from the high-pass filter 220, and a switching timing signal supplied from the comparison circuit 222. Based on the polarity of a motion detection signal and a switching timing signal, the CPU 230 outputs a control signal to start controlling an external device at the leading-edge timing of a positive-polarity pulse but to stop controlling an external device at the trailing-edge timing of a negative-polarity pulse.

Specifically, the CPU 230 output a control signal to start controlling an external device upon detecting a switching timing signal after determining the positive polarity of a motion detection signal but to stop controlling an external device after the lapse of the first time from the start timing. Alternatively, the CPU 230 outputs a control signal to stop controlling an external device when the second time has passed away from the timing of detecting the switching timing signal after determining the negative polarity of a motion detection signal.

The CPU 230 executes a control program to generate and supply a comparison reference voltage to the comparison circuit 222. Additionally, the CPU 230 determines an offset current, applied to the current-voltage conversion circuit 211, based on the level of an infrared detection signal, thus supplying the offset current to the current-voltage conversion circuit 211.

In this connection, it is possible to incorporate at least one of the absolute value circuit 221 and the comparison circuit 222 into the CPU 230.

Figure 3:
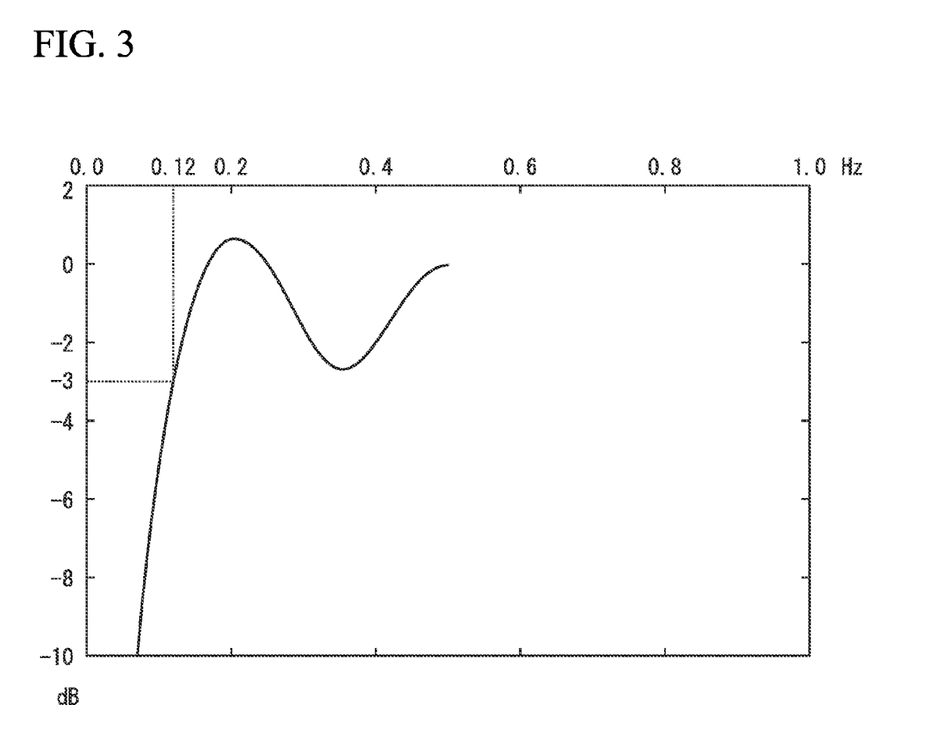
FIG. 3 is a graph showing an example of the filtering characteristic of a high-pass filter.

FIG. 3 is a graph showing an example of a filtering characteristic for use in the high-pass filter 220. In the graph of FIG. 3, the horizontal axis represents frequency (unit: Hz) while the vertical axis represents gain (unit: dB). In this graph, the cutoff frequency is set to 0.12 Hz. For example, the high-pass filter receives a state signal, supplied from the AD conversion circuit 213 having a sampling frequency of 1 Hz, so as to transmit signal components in a frequency range higher than 0.12 Hz while attenuating or blocking signal components in a frequency range below 0.12 Hz. Thus, it is possible for the high-pass filter 220 to eliminate or reduce effects due to temperature fluctuations or temperature drifting. That is, the control apparatus 10 does not use infrared detection signals in the resting state of a human body or in the slowing moving state of a human body.

Figure 4:
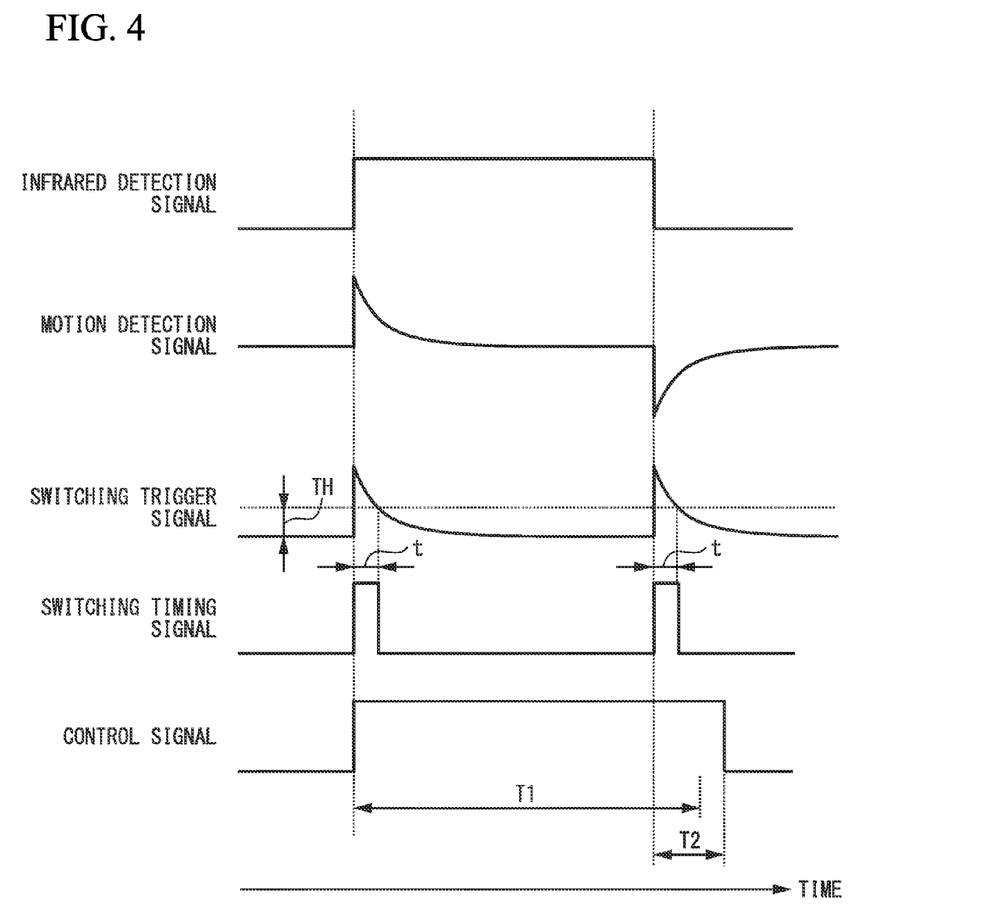
FIG. 4 is a timing chart of signals output from the main circuitry of the control apparatus shown in FIG. 2.

FIG. 4 is a timing chart of signals output from the main circuitry of the control apparatus 10 shown in FIG. 2. In the timing chart of FIG. 4, the horizontal direction represents time while the vertical direction represents levels. The timing chart shows a time series of a state of the infrared detection element 210 failed to detect a human body (i.e. a human undetected state) and a state of the infrared detection element 210 succeeded to detect a human body (i.e. a human detected state).

In FIG. 4, an infrared detection signal is output from the AD conversion circuit 213. The AD conversion circuit 213 outputs an infrared detection signal which becomes a low level in the period of the human undetected state but which becomes a high level in the period of the human detected state.

In FIG. 4, a motion detection signal is output from the high-pass filter 220. The high-pass filter 220 outputs a motion detection signal including a positive-polarity state signal component at the leading-edge timing of an infrared detection signal and a negative-polarity state signal component at the trailing-edge timing of an infrared detection signal.

In FIG. 4, a switching trigger signal is output from the absolute value circuit 221. The absolute value circuit 221 converts a negative-polarity state signal component, included in a motion detection signal, to a positive-polarity state signal component. That is, the absolute value circuit 221 converts a negative-polarity signal to a positive-polarity signal in a motion detection signal.

In FIG. 4, a switching timing signal is output from the comparison circuit 222. The comparison circuit 222 compares a switching timing signal with a comparison reference voltage TH supplied from the CPU 230. The comparison circuit 222 generates a pulse having a pulse width t, as the comparison result, at each of a first timing at which the level of a switching trigger signal exceeds the comparison reference voltage TH and a second timing at which the level of a switching trigger signal becomes lower than the comparison reference voltage TH.

In FIG. 4, a control signal is output from the CPU 230. The CPU 230 outputs a control signal to start controlling an external device upon detecting a pulse of a switching timing signal after determining the positive polarity of a motion detection signal but to stop controlling an external device after the lapse of a first time T1 from the start timing. Additionally, the CPU 230 stops controlling an external device by outputting a control signal when a second time T2 has passed away from the timing of detecting a pulse of a switching timing signal after determining the negative polarity of a motion detection signal.

That is, the CPU 230 outputs a control signal to stop controlling an external device when the second time T2 has passed away from the timing of detecting the negative polarity of a motion detection signal after starting controlling an external device. However, the CPU 230 stops controlling an external device when the first time T1 has passed away from the timing of starting controlling an external device without detecting the negative polarity of a motion detection signal. In this connection, the operation of the CPU 230 which is activated upon detecting the negative polarity of a motion detection signal just before the first time T1 has passed away from the timing of starting controlling an external device will be described later.

The control apparatus 10 determines the first time T1 exceeding the maximum time of a human staying thereby and the second time T2 sufficiently shorter than the first time T1 in consideration of applications or conditions of usage thereof. In this connection, the first time T1 can be set to an infinite time.

Next, the operation of the control apparatus 10 in which the controller 130 generates and outputs a control signal will be described.

Figure 5:
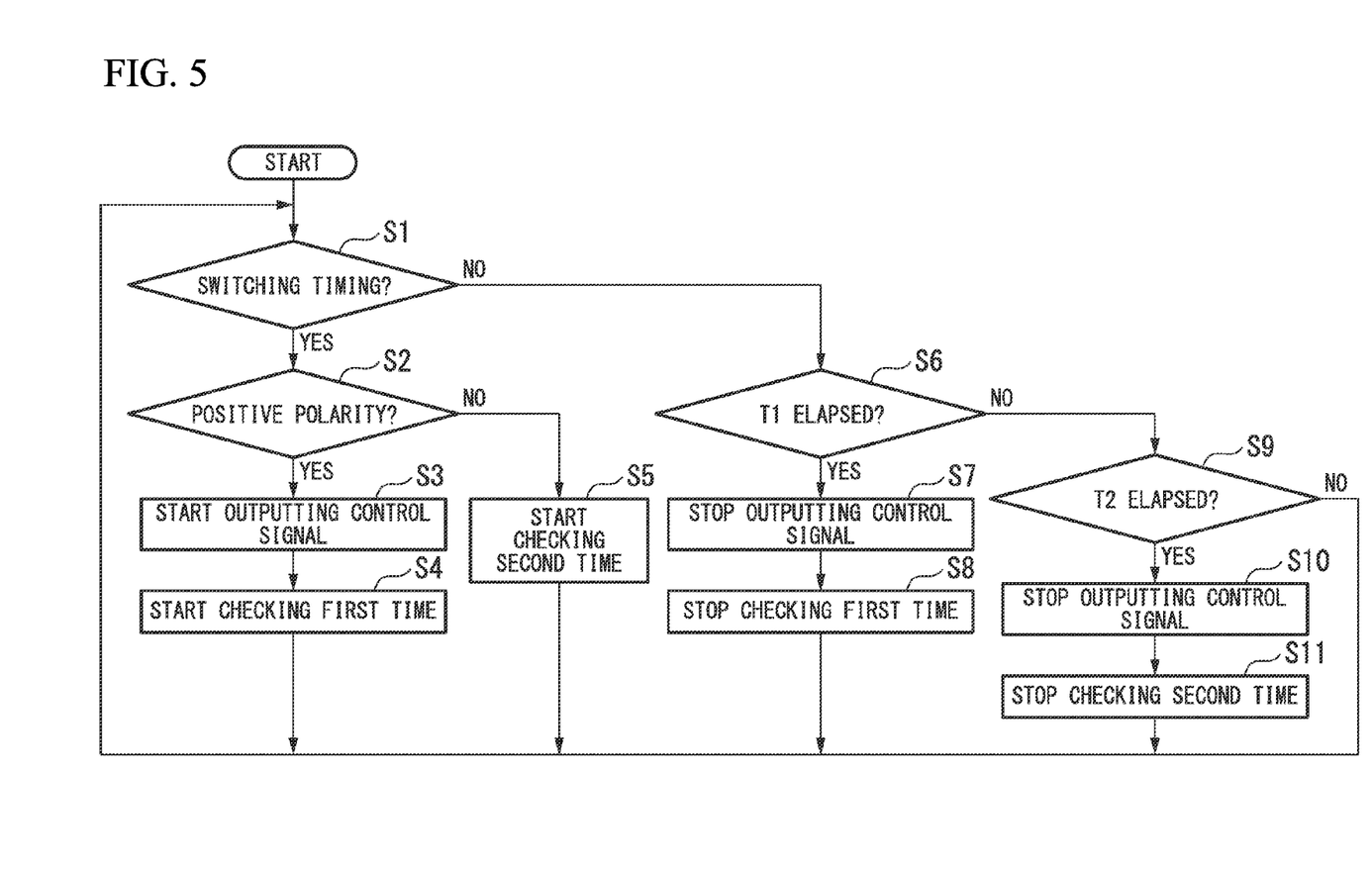
FIG. 5 is a flowchart showing a procedure of a CPU (Central Processing Unit), serving as a controller, which executes a control program to generate and output a control signal.

FIG. 5 is a flowchart showing the procedure in which the controller 130, serving as the CPU 230, executes a control program to generate and output a control signal.

In step S1, the CPU 230 receives a switching timing signal supplied from the comparison circuit 222 so as to determine the level of a switching timing signal. The CPU 230 proceeds to step S2 when the level of a switching timing signal is a high level (S1: YES). In contrast, the CPU 230 proceeds to step S6 when the level of a switching timing signal is a low level (S1: NO).

In step S2, the CPU 230 receives a motion detection signal supplied from the high-pass filter 220 so as to determine the polarity of a motion detection signal. The CPU 230 proceeds to step S3 when the polarity of a motion detection signal is a positive polarity (S2: YES). In contrast, the CPU 230 proceeds to step S5 when the polarity of a motion detection signal is a negative polarity (S2: NO).

In step S3, the CPU 230 starts outputting a control signal. Specifically, the CPU 230 increases the control signal from a low level to a high level.

Next, in step S4, the CPU 230 starts checking the first time. Specifically, the CPU 230 starts a first clock, incorporated or included therein, to start checking time. Next, the CPU 230 reverts to step S1.

In step S5, the CPU 230 starts checking the second time. Specifically, the CPU 230 starts a second clock, incorporated or included therein, to check time. Next, the CPU 230 reverts to step S1.

In step S6, the CPU 230 determines whether or not the first clock checks time equal to or longer than T1. When the first clock checks time equal to or longer than T1 (S6: YES), the CPU 230 proceeds to step S7. In contrast, when the checked time is shorter than T1 (S6: NO), the CPU 230 proceeds to step S9.

In step S7, the CPU 230 stops outputting a control signal. Specifically, the CPU 230 decreases the control signal from a high level to a low level.

Next, in step S8, the CPU 230 stops checking the first time. Specifically, the CPU 230 stops the first clock to check time. Next, the CPU 230 reverts to step S1.

In step S9, the CPU 230 determines whether or not the second clock checks time equal to or longer than T2. When the second clock checks time equal to or longer than T2 (S9: YES), the CPU 230 proceeds to step S10. In contrast, when the checked time is shorter than T2 (S9: NO), the CPU 230 reverts to step S1.

In step S10, the CPU 230 stops outputting a control signal. Specifically, the CPU 230 decreases the control signal from a high level to a low level.

Next, in step S11, the CPU 230 stops the second clock to check time. Specifically, the CPU 230 stops checking time with the second clock. Next, the CPU 230 reverts to step S1.

In step S6, when the first clock checks time equal to or longer than T1 (S6: YES) while the second clock checks time shorter than T2, the CPU 230 may proceed to step S7 when the second clock checks time equal to or longer than T2. Specifically, when the decision result of step S6 is "YES", the CPU 230 may proceed to step S6' to carry out the same process as step S9 before execution of step S7. In step S6', the CPU 230 determines whether or not the second clock checks time equal to or longer than T2. When the second clock checks time equal to or longer than T2 (S6': YES), the CPU 230 proceeds to step S7. When the checked time is less than T2 (S6': NO), the CPU 230 reverts to step S1.

Upon detecting a deflection of a human body just before the first clock checks time not passing T1, the CPU 230 may stop outputting a clock signal after the first clock checks time equal to or longer than T1 in accordance with the flowchart shown in FIG. 5. Alternatively, when the CPU 230 detects a deflection of a human body just before the first clock checks time not passing T1 on the condition that the second clock checks time less than T2, the CPU 230 may stop outputting a control signal when the second clock checks time equal to or longer than T2 (see FIG. 4).

As described above, the control apparatus 10 according to one embodiment of the present invention includes the detector 110 configured to detect an infrared ray emitted from a human body. Additionally, the control apparatus 10 includes the state signal generator 120 configured to generate a state signal including at least one of a first state signal component, indicating that a human body is approaching the detector 110, and a second state signal component indicating that a human body is leaving from the detector 110. Moreover, the control apparatus 10 includes the controller 130 configured to start controlling an external device upon detecting a first state signal component from a state signal or to stop controlling an external device upon detecting a second state signal component from a step signal.

Owing to the above configuration, it is possible for the control apparatus 10 to employ the detector 110 using an infrared detection element, such as a photodiode, a thermopile, and a pyroelectric infrared sensor, all of which are configured to detect infrared rays in a wavelength range including a wavelength of 10 µm. Therefore, the control apparatus 10 may not have a risk of erroneously detecting any objects other than human bodies. Additionally, the control apparatus 10 not configured to irradiate intense infrared rays can be applied to environments (e.g. medical sites) disallowing irradiation of infrared rays.

The state signal generator 120 may further include a motion detector, which carries out a filtering process on an infrared detection signal so as to detect that a human body is approaching or leaving from the detector 110, and a timing detector which detects the timing of detecting a human motion based on a motion detection signal output from a motion detector.

The controller 130 may stop controlling an external device when the first time has elapsed from the timing of starting controlling an external device. Upon detecting a second state signal component, the controller 130 may stop controlling an external device after the lapse of the second time shorter than the first time.

Owing to the above configuration, the control apparatus 10 is able to start controlling an external device when the controller 130 detects a positive polarity in an intensity variance of an infrared ray emitted from a human body approaching thereto and then to stop controlling an external device after the lapse of the first time from the start timing. During the controlling of an external device, the control apparatus 10 may stop controlling an external device when the second time has elapsed after the controller 130 detects a negative polarity in an intensity variance of an infrared ray emitted from a human body which is leaving from the control apparatus 10.

As described above, the control apparatus 10 is able to accurately detect a human motion while reducing an erroneous operation.

Next, a display apparatus using the control apparatus 10 will be described. The display device is designed to switch a power source between a standby state and an ON state in response to a control signal output from the control apparatus 10. Specifically, the display apparatus switches a power source from a standby state to an ON state when a user approaches the display apparatus and then takes his/her seat in front of the display apparatus; thereafter, the display apparatus switches to a standby state when the first time has elapsed from the timing of the ON state. Additionally, the display apparatus switches a power source from an ON state to a standby state when the second time has elapsed from the timing at which a user has left his/her seat and moved away from the display apparatus.

The display apparatus can switch to an ON state upon detecting a user's deflection in a standby state. For example, the display apparatus can switch to an ON state from a standby state when a user has left his/her seat after a user was being seated for the first time from the timing at which a user took his/her seat. Thereafter, the display apparatus switches to the standby state from the ON state after the lapse of the second time.

Upon detecting a user's motion in the standby state, the display apparatus switches to the ON state irrespective of a user's approach or a user's deflection. Thereafter, the display apparatus switches to the standby state after the lapse of the first time with respect to a user's approach. Alternatively, the display apparatus switches to the standby state after the lapse of the second time with respect to a user's deflection. At this time, it is necessary to increase the first time to be sufficiently longer than the second time. For example, the first time is set to "two hours" while the second time is set to "thirty minutes". The reason why the first time needs to be sufficiently longer than the second time is that a user's approach may have a high probability of a user's seating in front of the display apparatus while a user's deflection may have a high probability of a user's leaving from his/her seat. Thus, it is possible to reduce an erroneous operation of switching a power source in the display apparatus.

Figure 6:
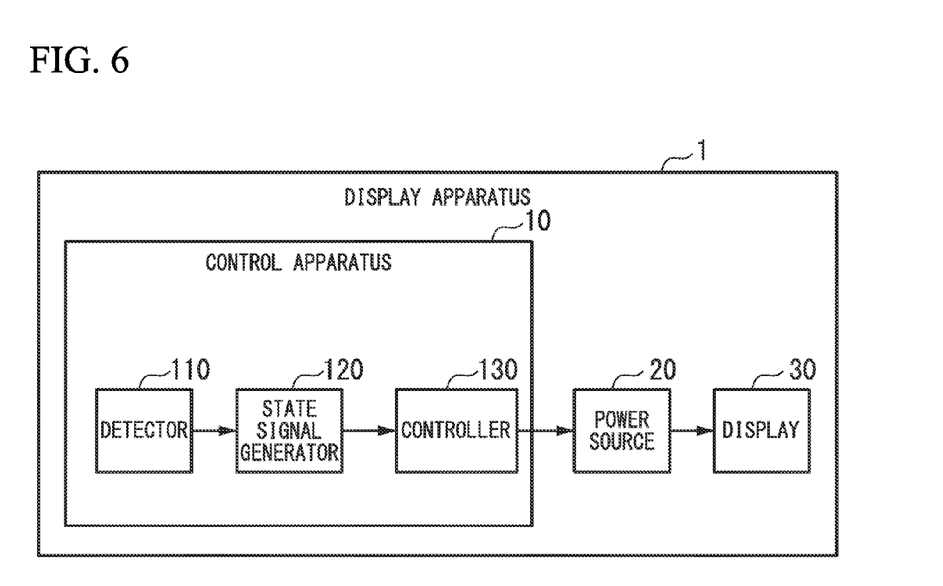
FIG. 6 is a block diagram showing the functional configuration of a display apparatus using the control apparatus.

FIG. 6 is a block diagram showing the functional configuration of the display apparatus using the control apparatus 10. As shown in FIG. 6, a display apparatus 1 includes a control apparatus 10, a power source 20, and a display 30. The control apparatus 10 has been described above in terms of the functional configuration and the operation; hence, the detailed description thereof will be omitted.

The power source 20 is a power device which receives a control signal supplied from the control apparatus 10 so as to generate dc power based on the control signal. Specifically, the power source 20 being supplied with ac power from an external device may operate in a standby mode when a control signal input thereto has a low level or in an ON mode when the control signal has a high level. The standby mode is an operation mode in which the power source 20 is being supplied with ac power from an external device so as to supply the predetermined micro current to loads. The ON mode is an operation mode in which the power source 20 supplies the predetermined dc power to loads. That is, the ON mode is an operation mode to carry out a normal display operation with the display 30. For example, the power source 20 can be embodied using a switching power source which can be turned on or off in response to a control signal. The power source 20 supplies a micro current to the control apparatus 10 in the standby state but supplies normal power to the control apparatus 10 in the ON state.

The display 30 is designed to carry out a display operation upon receiving power supplied from the power source 20. For example, the display 30 can be embodied using a display device such as a liquid crystal display panel.

The control apparatus 10 installed in the display apparatus 1 determines that the time exceeding the maximum time of user's seating is set to the first time T1 (e.g. two hours) while the time sufficiently shorter than the first time T1 is set to the second time T2 (e.g. thirty minutes). In this connection, the first time T1 can be set to an infinite time. Using an infinite time serving as the first time T1, the display apparatus switches to the standby state from the ON state upon detecting a user's approach, and then the display apparatus switches to the standby state from the ON state when the second time T2 has elapsed after the timing of detecting a user's deflection.

Owing to the above configuration, the display apparatus 1 sets the power source 20 to the ON mode upon detecting an infrared ray emitted from a human body approaching thereto with the controller 130 of the control apparatus 10, and then the display apparatus 1 switches the power source 20 to the standby mode from the ON mode when the first time has elapsed after the timing of setting the ON mode. During the period of setting the power source 20 to the ON mode, the display apparatus 1 can switch the power source 20 to the standby mode from the ON mode when the second time has elapsed after the controller 130 detects a user's deflection.

In this connection, part of the control apparatus 10 according to the embodiment of the present invention, e.g. the function of the controller 130, can be embodied using a computer. In this case, it is possible to store control programs representing control functions in computer-readable storage media, and therefore computer systems may load control programs stored in storage media so as to execute control programs, thus achieving control functions. Herein, computer systems may embrace operating systems (OS) and hardware such as peripheral devices. Additionally, computer-readable storage media may refer to flexible disks, magneto-optic disks, optical disks, portable storage media such as memory cards, and any storage devices such as magnetic hard disks and solid state drives installed in computer systems. Moreover, computer-readable storage media may embrace any media, which can dynamically hold programs for a short time, such as computer networks like the Internet and communication lines used to transmit programs through telephone lines and mobile phone lines as well as other media, which can hold programs for a certain time, such as non-volatile memory installed in computer systems serving as servers or clients. The foregoing control programs may be drafted to achieve part of the foregoing functions; alternatively, the foregoing control programs may be combined with pre-installed programs of computer systems so as to achieve the foregoing functions.

In the foregoing embodiment, it is possible to modify the display apparatus 1 such that the display 30 is configured using a display panel having a backlight supplied with power which is controlled in response to a control signal output from the control apparatus 10. That is, the display apparatus 1 sets the backlight to a normal mode (i.e. a normal power consumption mode) upon detecting a user's approach with the controller 130, and then the display apparatus 1 switches the backlight from the normal mode to a low power consumption mode when the first time has elapsed after the timing of setting the normal mode. During the period of setting the backlight to the normal mode, the display apparatus 1 switches the backlight to the low power consumption mode from the normal mode when the second time has elapsed after the timing of detecting a user's deflection with the controller 130.

It is possible to modify the display apparatus 1 such that the display 30 having a screen saver display function can activate a screen saver in response to a control signal output from the control apparatus 10. That is, the display apparatus 1 deactivates a screen saver upon detecting a user's approach with the controller 130, and then the display apparatus 1 activates the screen saver when the first time has elapsed after the timing of deactivating the screen saver. During the period of deactivating a screen saver, the display apparatus 1 can activate the screen saver when the second time has elapsed after the timing of detecting a user's deflection with the controller 130.

As described above, the embodiment of the present invention is described in detail with reference to the drawings; however, concrete configurations may not be limited to the embodiment, which therefore embrace design choices not departing from the subject matter of the present invention.

REFERENCE SIGNS LIST 1 display apparatus
10 control apparatus
110 detector
120 state signal generator
130 controller
210 infrared detection element
211 current-voltage conversion circuit
212 inversion circuit
213 analog-digital conversion circuit
220 high-pass filter
221 absolute value circuit
222 comparison circuit
230 CPU

The invention claimed is:

1. A control apparatus configured to control an external device, the control apparatus comprising:
   a detector configured to detect an infrared ray emitted from a human body;
   a state signal generator configured to generate a state signal based on an intensity of the infrared ray detected by the detector, wherein the state signal includes a first state signal component having a positive polarity indicating the human body approaching the external device or a second state signal component having a negative polarity indicating the human body leaving from the external device; and
   a controller configured to start controlling the external device upon detecting the first state signal component from the state signal and to stop controlling the external device upon detecting the second state signal component from the state signal.

2. The control apparatus according to claim 1, wherein the controller stops controlling the external device when a first time elapses from a timing of starting controlling the external device while the controlling the external device after a lapse of a second time, shorter than the first time, upon detecting the second state signal component.

3. The control apparatus according to claim 1, wherein the detector detects the infrared ray having a predetermined wavelength emitted from the human body.

4. The control apparatus according to claim 1, wherein the detector comprises:
   an infrared detection element detecting the infrared ray emitted from the human body to generate a current depending on the intensity of the infrared ray;
   a current-voltage conversion circuit receiving the current from the infrared detection element;
   an inversion circuit receiving an output of the current-voltage conversion circuit; and
   an analog to digital (AD) conversion circuit receiving an output of the inversion circuit.

5. The control apparatus according to claim 4, wherein the current-voltage conversion circuit receives an offset current, supplied from the controller through a plurality of partial resistors, to apply an offset voltage.

6. The control apparatus according to claim 5, wherein the offset voltage limits an input level of the AD conversion circuit to a fraction of a dynamic range.

7. The control apparatus according to claim 6, wherein the current-voltage conversion circuit receives the offset voltage to generate a detection voltage, depending on a feedback resistance to supply the detection voltage to the inversion circuit.

8. The control apparatus according to claim 7, wherein the inversion circuit inverts a polarity of the detection voltage supplied from the current-voltage conversion circuit.

9. The control apparatus according to claim 8, wherein the AD conversion circuit receives an analog infrared detection signal, supplied from the inversion circuit, to convert the analog infrared detection signal into a digital infrared detection signal, and to supply the digital infrared detection signal to the state signal generator and the controller.

10. The control apparatus according to claim 9, wherein the state signal generator comprises:
- a high-pass filter that receives the digital infrared detection signal, supplied from the AD conversion circuit, to transmit signal components of a frequency band, higher than a predetermined cutoff frequency, and to block signal components of a frequency band below the cutoff frequency;
- an absolute value circuit receiving an output of the high-pass filter; and
- a comparison circuit receiving an output of the absolute value circuit.

11. The control apparatus according to claim 10, wherein the high-pass filter supplies a motion detection signal to the absolute value circuit and the controller.

12. The control apparatus according to claim 11, wherein the absolute value circuit receives the motion detection signal, supplied from the high-pass filter, to convert a negative-polarity state signal component to a positive-polarity state signal component, and to generate a switching trigger signal supplied to the comparison circuit.

13. The control apparatus according to claim 12, wherein the comparison circuit compares the switching trigger signal supplied from the absolute value circuit to a comparison reference voltage supplied from the controller.

14. The control apparatus according to claim 13, wherein the comparison circuit generates a pulse signal which becomes a high level in response to a higher signal component of the switching trigger signal than the comparison reference voltage or which becomes a low level in response to a lower signal component of the switching trigger signal than the comparison reference voltage, for supplying the pulse signal, serving as a switching timing signal, to the controller.

15. A control method for controlling an external device, the control method comprising:
- detecting an infrared ray emitted from a human body;
- generating a state signal based on an intensity of the infrared ray being detected, wherein the state signal includes a first state signal component having a positive polarity indicating the human body approaching the external device or a second state signal component having a negative polarity indicating the human body leaving from the external device; and
- starting controlling the external device upon detecting the first state signal component from the state signal and stopping controlling the external device upon detecting the second state signal component from the state signal.

16. The control method according to claim 15, wherein the detecting comprises detecting the infrared ray having a predetermined wavelength emitted from the human body.

17. A display apparatus, comprising:
- a detector configured to detect an infrared ray emitted from a human body;
- a state signal generator configured to generate a state signal based on an intensity of the infrared ray detected by the detector, wherein the state signal includes a first state signal component having a positive polarity indicating an approach of the human body or a second state signal component having a negative polarity indicating a deflection of the human body;
- a controller configured to start outputting a control signal upon detecting the first state signal component from the state signal and to stop outputting the control signal upon detecting the second state signal component from the state signal;
- a power source configured to generate power based on the control signal output from the controller; and
- a display configured to carry out a display operation based on the power of the power source being controlled by the controller.

18. The display apparatus according to claim 17, wherein the controller starts outputting the control signal to switch the power source to an ON state from a standby state upon detecting the first state signal component or the second state signal component from the state signal,
wherein the controller switches the power source to the standby state from the ON state after a lapse of a first time when the first state signal component is detected from the state signal, and
wherein the controller switches the power source to the standby state from the ON state after a lapse of a second time, shorter than the first time, when the second state signal component is detected from the state signal.

19. The display apparatus according to claim 17, wherein the detector detects the infrared ray having a predetermined wavelength emitted from the human body.

* * * * *